United States Patent
Rebiffe

(10) Patent No.: US 10,488,743 B2
(45) Date of Patent: Nov. 26, 2019

(54) LASER-DIODE-BASED SOURCE OF MONOCHROMATIC LIGHT

(71) Applicant: XYZED, Paris (FR)

(72) Inventor: Maurice Rebiffe, Paris (FR)

(73) Assignee: XYZED, Paris (FR)

(*) Notice: Subject to any disclaimer, the term of this patent is extended or adjusted under 35 U.S.C. 154(b) by 45 days.

(21) Appl. No.: 15/564,000

(22) PCT Filed: Apr. 1, 2016

(86) PCT No.: PCT/FR2016/050753
§ 371 (c)(1),
(2) Date: Oct. 3, 2017

(87) PCT Pub. No.: WO2016/156759
PCT Pub. Date: Oct. 6, 2016

(65) Prior Publication Data
US 2018/0136550 A1    May 17, 2018

(30) Foreign Application Priority Data
Apr. 3, 2015  (FR) .................... 15 52885

(51) Int. Cl.
*G03B 21/20* (2006.01)
*F21V 8/00* (2006.01)

(52) U.S. Cl.
CPC ....... *G03B 21/2033* (2013.01); *G02B 6/0006* (2013.01); *G03B 21/208* (2013.01); *G03B 21/2013* (2013.01); *G03B 21/2066* (2013.01)

(58) Field of Classification Search
CPC ............ G03B 21/2033; G03B 21/2013; G03B 21/2066; G03B 21/208; G03B 21/20; G03B 21/2006; G03B 21/145; G02B 6/0006; G02B 6/0005; F21V 7/00; F21V 7/05; F21V 15/00; F21V 15/01; F12V 7/0008

See application file for complete search history.

(56) References Cited

U.S. PATENT DOCUMENTS

| | | | |
|---|---|---|---|
| 6,224,216 B1 | 5/2001 | Parker et al. | |
| 6,402,347 B1 * | 6/2002 | Maas | F21V 5/007 315/312 |
| 6,547,400 B1 * | 4/2003 | Yokoyama | G03B 21/208 353/98 |

(Continued)

FOREIGN PATENT DOCUMENTS

JP    2001356404 A    12/2001

OTHER PUBLICATIONS

International Search Report from PCT Application No. PCT/FR2016/050753,dated Jul. 14, 2016.

(Continued)

*Primary Examiner* — Bao Q Truong
(74) *Attorney, Agent, or Firm* — Workman Nydegger

(57) ABSTRACT

In a light projector including a laser diode module suitable for forming a light bundle of color and dimensions that are determined from parallel light beams from each of the laser diodes in the module, there is provided a light-tight box, an optical system constituted by an off-axis parabolic mirror for receiving the light bundle and for focusing it, after reflecting it in a perpendicular direction onto the inlet of a sole outlet optical fiber of the box.

20 Claims, 2 Drawing Sheets

(56) References Cited

U.S. PATENT DOCUMENTS

| | | | |
|---|---|---|---|
| 2002/0064043 A1* | 5/2002 | Ariga | G02B 6/0006 |
| | | | 362/235 |
| 2002/0114157 A1* | 8/2002 | Chuang | G02B 6/0006 |
| | | | 362/231 |
| 2003/0112639 A1 | 6/2003 | Stack | |
| 2009/0010008 A1* | 1/2009 | Ochi | G03B 21/20 |
| | | | 362/373 |
| 2009/0103055 A1* | 4/2009 | Sun | G03B 21/16 |
| | | | 353/52 |
| 2013/0308104 A1* | 11/2013 | Nishimori | G03B 21/2013 |
| | | | 353/37 |

OTHER PUBLICATIONS

French Search Report from FR Application No. 1552885, dated Feb. 16, 2016.

\* cited by examiner

LASER-DIODE-BASED SOURCE OF MONOCHROMATIC LIGHT

FIELD OF THE INVENTION

The present invention relates to the field of lighting and it relates more particularly to a source of laser light for cinema or video projectors.

PRIOR ART

Until recently, light projectors were conventionally constituted by an incandescent lamp or a discharge lamp of the xenon, mercury, HMI or HTI type, together with a reflector for directing the light beam coming from the lamp towards an optical system having one or more lenses arranged one after another in the light beam. In theater or stage spotlights, various shutters are also placed at the outlet of the optical system in order to perform special effects, e.g. an overlay knife, a color wheel, an iris, or a gobo wheel.

Nevertheless, for several years, projectors have been available on the lighting market, in particular for digital video and cinema, in which the light sources that are to replace those discharge lamps or incandescent lamps are light-emitting diodes (LEDs) or laser diodes, as in U.S. Pat. No. 6,224,216. Unfortunately, those projectors are penalized by the light sources being large in size, due essentially to the very high number of optical fibers used to collect the light. That large number of optical fibers results specifically from the difficulty of collimating the beams from the diodes on a single focal point in order to enable the light to be concentrated in a single outlet optical fiber. Furthermore, the diodes are series-connected in small numbers, often in series of six diodes to 12 diodes (up to a maximum of 24), and those series are generally grouped together by primary color (red, green, blue). In addition, each color group is of low power (on average an optical power of 4 watts (W) to 5 W) and the power is very uneven (red compared with blue, for example), which does not make it easy to obtain high power lighting in a small volume that is easy to access and that can be assembled easily, both for fabrication and for maintenance.

Object and Definition of the Invention

The present invention proposes escaping from this constraint with a light projector in which the light source makes it possible to deliver high lighting power in a volume that is particularly compact. An object of the invention is also to provide a light source that may be monochromatic or multi-color.

These objects are achieved by a laser diode light source for a light projector comprising a laser diode module suitable for forming a light bundle of color and dimensions that are determined from parallel light beams from each of the laser diodes in the module, the source being characterized in that it further comprises, in a light-tight box, an optical system constituted by an off-axis parabolic mirror for receiving said light bundle and for focusing it, after reflecting it in a perpendicular direction onto the inlet of a sole outlet optical fiber of said box.

Thus, by eliminating the set of collimation optical fibers and by reflecting the various light beams from the laser diodes onto a single focusing element, it becomes possible to concentrate all of the beams on a single focal point in order to provide a laser light source of high power (delivering an optical power of 15 W, or more) that is particularly compact.

Preferably, said dimensions of the light bundle are determined by the number of laser diodes constituting said laser diode module.

Advantageously, the laser diode light source of the invention may comprise a laser diode module having laser diodes of the same wavelength, such that said color of said light bundle is determined by the wavelength of said laser diodes constituting said laser diode module, or indeed it may comprise a laser diode module with laser diodes of first, second, and third wavelengths corresponding to the primary colors red, green, and blue, such that said color of said light bundle is determined by additive synthesis of said red, green, and blue colors.

Preferably, said laser diodes are grouped together by color in said laser diode module or are distributed in said laser diode module in such a manner that no two laser diodes of the same wavelength are beside each other.

Advantageously, said box is a rectangular parallelepiped having six faces constituted by four portions mounted by mutual engagement, the first, second, and third portions forming five faces of said box and the sixth portion of the box forming the sixth face and being constituted by said laser diode light module, which forms a lid. Said first portion may itself form three faces of said box and present a U-shape, with an end wall that is to receive said optical system and having two side walls connected perpendicularly thereto, one of the two side walls being for receiving said outlet optical fiber.

The invention also provides a light projector that is monochromatic, multi-color, or polychromatic of RGB type and including at least one laser diode light source as specified above.

BRIEF DESCRIPTION OF THE DRAWINGS

The characteristics and advantages of the present invention appear better from the following description given by way of non-limiting indication and with reference to the accompanying drawings, in which.

DETAILED DESCRIPTION OF A PREFERRED EMBODIMENT

Figure 1:
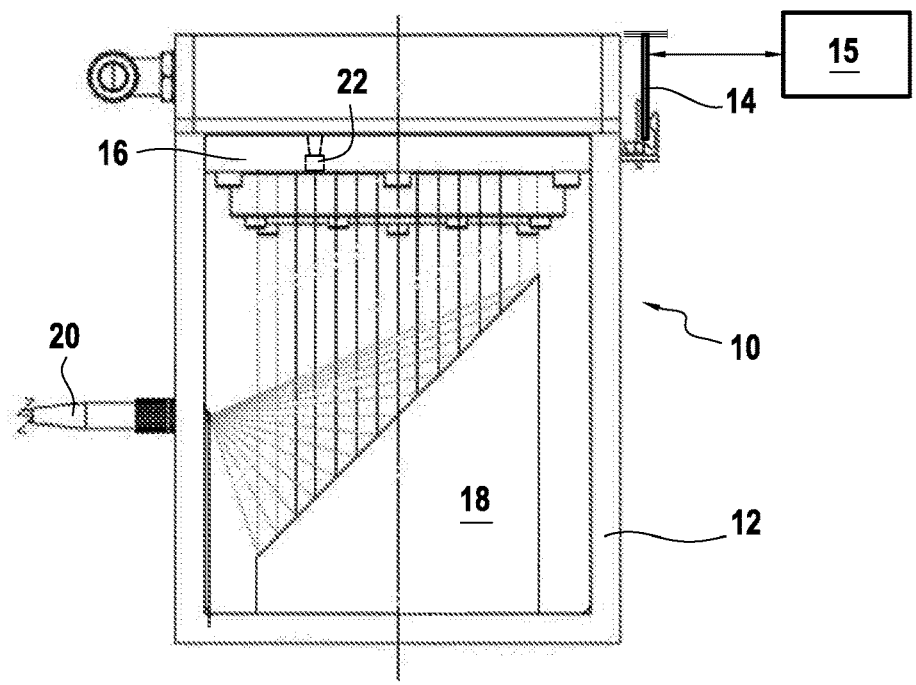
FIG. 1 is a plan view of a projector of the invention showing the paths followed by the light beams.

FIG. 1 shows a laser diode light source in accordance with the invention e.g. for mounting in a standard power supply rack of the 2 U, 3 U, or 4 U type (i.e. suitable for being mounted directly in a standard 19 inch bay). However, given the compactness of the light source, it is also possible to envisage any other type of integration, providing it complies with the radii of curvature for the output optical fiber(s), and with the connection of the cooling system in accordance with the safety standards associated with the light source.

The light source 10 comprises a particularly compact box 12 that is lightproof and dustproof, containing an electronic portion for receiving a diode control card 14 controlled by an external control unit 15, and an optical portion that comprises firstly a laser diode light module 16 having its own heat dissipation means for dissipating the heat given off by the laser diodes and serving to generate a high-power light beam (typically having an optical power greater than 10 W to 15 W), and secondly an optical system 18 for collating and focusing the light beam coming from the module into an outlet optical fiber 20.

Figure 2:
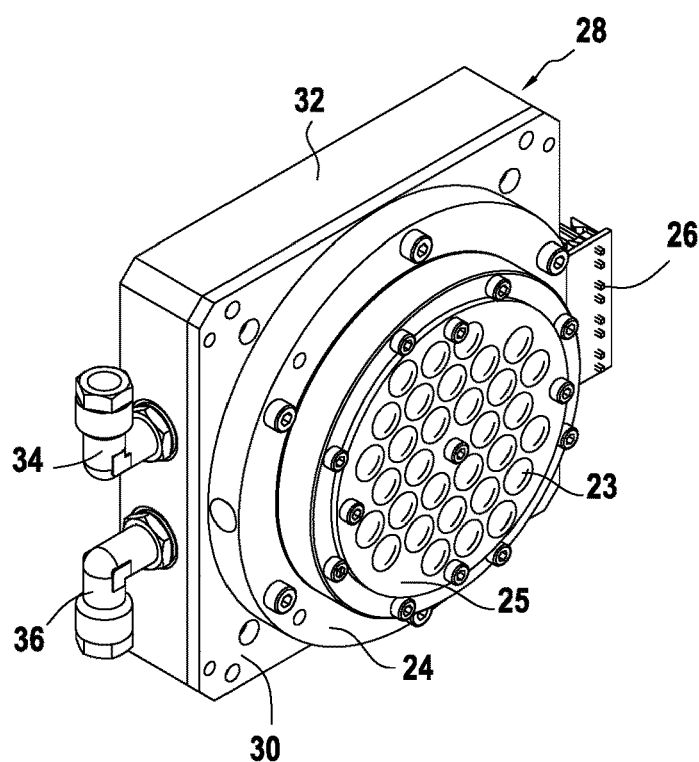
FIG. 2 is a perspective view of a laser diode lighting module of the FIG. 1 projector.

As shown in FIG. 2, the laser diode module 16 has a large number of lasers 22 having the same wavelength that are regularly distributed in the form of an array (32 diodes in the figure corresponding to green diodes and typically 20 to 60 diodes of power that varies depending on the type and the technology used) that are mounted on a support plate 24, each laser diode being surmounted by a plastics or glass lens 23 of very small size carried by a centering element 25 so as to produce a corresponding number of parallel light beams, these beams together forming a kind of bundle of light of the color associated with the wavelength of the laser diodes of the array.

The support plate 24 incorporates conductor tracks (not shown) connected to electrical power supply terminals 26 for connection to the control card 14, and it is in direct contact with means 28 for dissipating the heat given off by the array of laser diodes. These heat dissipation means are described in greater detail in the application filed in the name of the Applicant and entitled "Diode lighting module with improved cooling" and they comprise a metal junction plate 30 having an outside face in direct contact with the support plate and an inside face supporting a cellular metal foam contained in a box 32 having the shape of a partitioned vessel that is leaktight for a cooling fluid, advantageously water in the liquid phase or glycol water, and for which the metal junction plate constitutes the lid. The cooling liquid is conveyed both to and from the laser diode modules by go and return pipes 34 and 36.

Returning to FIG. 1, the laser diode light source shown thus includes in a light-tight box 12 in the form of a six-faced rectangular parallelepiped, a laser diode module 16 suitable for forming a light bundle from the parallel light beams from each of the laser diodes in the module delivering a color that is determined by the wavelength of the identical laser diode making it up, the dimensions of the light bundle being determined by the size of the array and thus by the number of laser diodes (for example 32 green diodes having a wavelength typically lying in the range 510 micrometers (μm) to 530 μm, 23 red diodes having a wavelength typically lying in the range 620 μm to 650 μm, and 23 blue diodes having a wavelength typically lying in the range 430 μm to 460 μm), which number may vary depending on the color and on the technological level of each of the colors under consideration. More particularly, the light bundle is directed towards the optical system 18 constituted by an off-axis parabolic mirror arranged across the light bundle so as to reflect the light bundle in a perpendicular direction and focus it on a determined focal point PF at the inlet to the sole outlet optical fiber 20.

Figure 3:
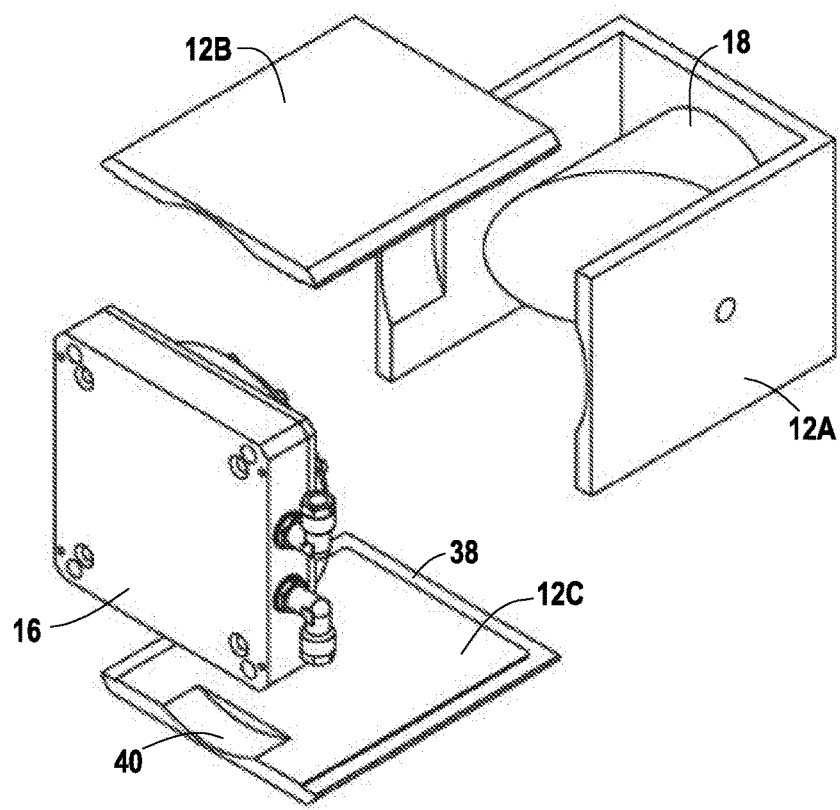
FIG. 3 is an exploded perspective view of the FIG. 1 projector.

FIG. 3 shows more specifically the structure of the box 12, which, in order to facilitate assembly and maintenance, is constituted by only four portions that are preferably mounted by interfitting. A first portion 12A comprises three faces of the box and presents a U-shape with an end wall that connects perpendicularly with two side walls, the end wall being for receiving the optical system 18, and one of the two side walls being for receiving the outlet optical fiber 20. Second and third portions 12B and 12C form respective lateral faces of the box each connecting together the two side walls and the end wall. Finally, a fourth portion of the box, which is constituted by the laser diode lighting module 16 serves to close the box so as to form a lid. Assembly is made easier by grooves 28, and in order to match the circular shape of the support plate 24, indentations 40 are formed in the two lateral walls and in the two side walls at their ends that come into contact with the plate.

Figure 4A:
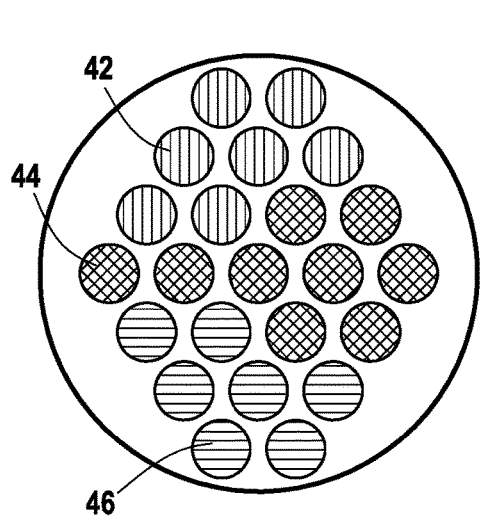
FIGS. 4A and 4B are diagrams showing a possible distribution of laser diodes in the FIG. 2 lighting module.
Figure 4B:
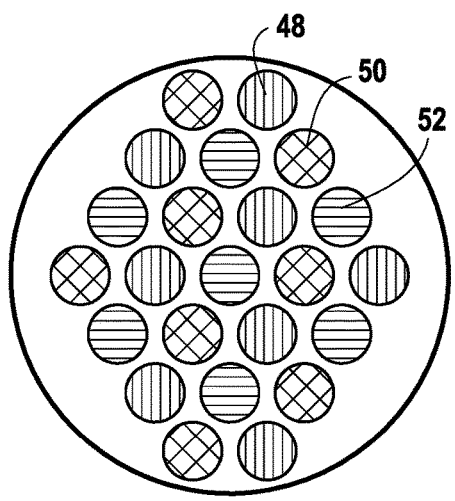

It should be observed that although the above-described light source enables high-power monochromatic light to be provided, and also multi-color light by associating together three monochromatic lights of three different wavelengths corresponding to three primary colors (e.g. red, green, and blue) and by selecting an appropriate number of laser diodes so as to obtain sources of balanced power, it is also possible with the same optical system (the off-axis mirror avoiding any need to deposit an achromatic layer on a specific optical unit) to make a polychromatic light source of RGB type providing that instead of having laser diodes all of the same wavelength as in a monochromatic light module, laser diodes are made available of three different wavelengths corresponding to three primary colors (e.g. red, green, and blue), and they are distributed over the laser diode array in a configuration in which they are either grouped together by color as shown in FIG. 4A, where for example the reference 42 corresponds to the color green, the reference 44 corresponds to the color red, and the reference 46 corresponds to the color blue, or else they are distributed as shown in FIG. 4B, such that no two laser diodes of the same color are in contact with each other (reference 48 corresponds to the color green, reference 50 corresponds to the color red, and reference 52 corresponds to the color blue).

The distributed configuration, like a television screen, makes it very simple to manage light of any color (including white), whereas the grouped-together configuration presents the advantage of making it possible to obtain a white by additive synthesis of the colors red, green, and blue because the colors are better balanced. Specifically, red laser diodes are nowadays of lower power than green or blue laser diodes, such that combining an equivalent number of laser diodes of each color does not make it possible to obtain good quality white (in particular in order to satisfy digital cinema initiatives (DCI) standards). By increasing the number of red laser diodes, it is thus possible to provide a better balance.

Naturally, it is clear that depending on the type of laser diodes used, this additional number could be of a color other than the color red, with the corresponding increase in the number of laser diodes for each of these three colors R, G, or B serving to obtain a perfect white.

The invention claimed is:

1. A laser diode light source for a light projector comprising a laser diode module suitable for forming a light bundle of color and dimensions that are determined from parallel light beams from each of a plurality of laser diodes in the laser diode module, wherein the laser diode light source further comprises, in a light-tight box, an optical system constituted by an off-axis parabolic mirror for receiving said light bundle and for focusing said light bundle, after reflecting said light bundle in a perpendicular direction relative to an orientation of the laser diode module onto an inlet of a sole outlet optical fiber of said light-tight box;

wherein said light-tight box is a rectangular parallelepiped having six faces constituted by four portions mounted by mutual engagement, first, second, and third portions of the light-tight box forming five faces of said light-tight box and a fourth portion of the light-tight box forming a sixth face and being constituted by said diode light module, which forms a lid.

2. The laser diode light source according to claim 1, wherein said dimensions of the light bundle are determined by a number of laser diodes constituting said laser diode module.

3. The laser diode light source according to claim 1, wherein said laser diode module having laser diodes of the same wavelength, such that said color of said light bundle is determined by a wavelength of said laser diodes constituting said laser diode module.

4. The laser diode light source according to claim 1, wherein said laser diode module having laser diodes of first, second, and third wavelengths corresponding to the primary colors red, green, and blue, such that said color of said light bundle is determined by additive synthesis of said red, green, and blue colors.

5. The laser diode light source according to claim 4, wherein said laser diodes are grouped together by color in said laser diode module.

6. The laser diode light source according to claim 4, wherein said laser diodes are distributed in said laser diode module in such a manner that no two laser diodes of the same wavelength are beside each other.

7. The laser diode light source according to claim 1, wherein said first portion itself forms three faces of said light-tight box and presents a U-shape, with an end wall that is to receive said optical system and having two side walls connected perpendicularly thereto, one of the two side walls being for receiving said outlet optical fiber.

8. The laser diode light source according to claim 1, wherein each of said laser diodes is surmounted by a plastics or glass lens carried by a centering element, so as to deliver each of said parallel light beams.

9. A light projector including at least one laser diode light source according to claim 1.

10. A laser diode light source for a light projector comprising:
   a laser diode module suitable for forming a light bundle of color and dimensions that are determined from parallel light beams from each of a plurality of laser diodes in the laser diode module, wherein the laser diode light source further comprises, in a light-tight box, an optical system constituted by an off-axis parabolic mirror for receiving said light bundle and for focusing said light bundle, after reflecting said light bundle in a perpendicular direction relative to an orientation of the laser diode module onto an inlet of a sole outlet optical fiber of said light-tight box;
   wherein said light-tight box is a rectangular parallelepiped having six faces constituted by four portions mounted by mutual engagement, first, second, and third portions of the light-tight box forming five faces of said light-tight box and a fourth portion of the light-tight box forming a sixth face and being constituted by said diode light module, which forms a lid;
   wherein said first portion itself forms three faces of said light-tight box and presents a U-shape, with an end wall that is to receive said optical system and having two side walls connected perpendicularly thereto, one of the two side walls being for receiving said outlet optical fiber.

11. The laser diode light source for a light projector of claim 10, wherein the laser diode light source is configured to provide an optical power of at least 10 W.

12. The laser diode light source for a light projector of claim 11, wherein the optical power is at least 15 W.

13. The laser diode light source for a light projector of claim 10, further comprising heat dissipation means comprising a metal junction plate arranged to contact a support plate supporting the laser diode module.

14. The laser diode light source for a light projector of claim 10, wherein said laser diode module having laser diodes of first, second, and third wavelengths corresponding to the primary colors red, green, and blue, such that said color of said light bundle is determined by additive synthesis of said red, green, and blue colors.

15. The laser diode light source for a light projector of claim 14, wherein the laser diodes of first, second, and third wavelengths are provided in proportions yielding a white color.

16. The laser diode light source for a light projector of claim 14, wherein the number of laser diodes corresponding to red is larger than the number of laser diodes corresponding to green or blue.

17. The laser diode light source for a light projector of claim 14, wherein a total of between 20-60 laser diodes are provided.

18. The laser diode light source for a light projector of claim 17, wherein a number of laser diodes provided is varied to determine a dimension of the light bundle.

19. The laser diode light source for a light projector of claim 10, wherein at least one indentation is defined in one of the first, second, and third portions of the box, the at least one indentation configured to cooperate with a shape of the laser diode light module.

20. The laser diode light source for a light projector of claim 19, wherein the at least one indentation is defined in each of the first, second, and third portions of the box.

* * * * *